United States Patent [19]
Enck et al.
[11] Patent Number: 4,778,565
[45] Date of Patent: Oct. 18, 1988

[54] METHOD OF FORMING PANEL TYPE RADIATION IMAGE INTENSIFIER

[75] Inventors: Richard S. Enck, San Jose; F. Dan Meadows, Los Altos, both of Calif.
[73] Assignee: Picker International, Inc., Cleveland, Ohio

[21] Appl. No.: 119,827
[22] Filed: Nov. 12, 1987

Related U.S. Application Data

[62] Division of Ser. No. 838,100, Mar. 10, 1986, Pat. No. 4,730,103.

[51] Int. Cl.[4] .................... B44C 1/22; C03C 15/00; C03C 25/06
[52] U.S. Cl. .................... 156/644; 156/654; 156/659.1; 156/663
[58] Field of Search .............. 156/629, 633, 644, 654, 156/655, 659.1, 663; 65/31; 250/213 VT, 385, 483.1, 486.1; 430/23; 427/160, 162–166, 238

[56] References Cited

U.S. PATENT DOCUMENTS

| | | | |
|---|---|---|---|
| Re. 31,691 | 10/1984 | Wang | 250/213 VT |
| 2,266,349 | 12/1941 | Wempe . | |
| 2,739,243 | 3/1956 | Sheldon . | |
| 2,806,958 | 9/1957 | Zunick | 156/663 X |
| 2,827,571 | 3/1958 | Klasens et al. . | |
| 2,879,147 | 3/1959 | Baker | 156/654 X |
| 3,020,433 | 2/1962 | Day | 156/663 X |
| 3,089,956 | 5/1963 | Harper . | |
| 3,344,276 | 9/1967 | Balding . | |
| 3,453,471 | 7/1969 | Sheldon . | |
| 3,783,297 | 1/1974 | Houston . | |
| 3,783,299 | 1/1974 | Houston . | |
| 3,863,094 | 1/1975 | Orthuber . | |
| 4,100,445 | 7/1978 | Suffredini et al. . | |
| 4,101,781 | 7/1978 | Neukermans et al. . | |
| 4,126,813 | 11/1978 | Orthuber . | |
| 4,140,900 | 2/1979 | Wang | 250/213 VT |
| 4,186,302 | 1/1980 | Wang | 250/213 VT |
| 4,208,577 | 6/1980 | Wang | 250/213 VT |
| 4,255,666 | 3/1981 | Wang et al. | 250/486 |
| 4,264,408 | 4/1981 | Benham | 156/663 X |
| 4,276,335 | 6/1981 | Lemmond | 156/663 X |
| 4,598,228 | 7/1986 | Obata et al. . | |
| 4,626,694 | 12/1986 | Sano et al. | 250/483.1 |
| 4,670,094 | 6/1987 | Obata et al. . | |
| 4,686,369 | 8/1987 | McDaniel et al. | 250/385 |

FOREIGN PATENT DOCUMENTS

| | | | |
|---|---|---|---|
| 0126564 | 11/1984 | European Pat. Off. . | |
| 1103951 | 11/1955 | France . | |
| 2545269 | 11/1984 | France . | |
| 2347923 | 7/1974 | Fed. Rep. of Germany . | |
| 3325035 | 1/1985 | Fed. Rep. of Germany . | |
| 1444161 | 7/1976 | United Kingdom . | |

OTHER PUBLICATIONS

Corning Product Brochure No. FPG-4, "Fotoform" and Fotoceram Precision Photosensitive Glass Materials (not dated).

*Primary Examiner*—William A. Powell
*Attorney, Agent, or Firm*—Timothy B. Gurin

[57] ABSTRACT

A multistage, proximity type, radiation image intensifier tube having improved performance characteristics and more rugged construction is provided. A scintillator assembly is comprised of a first ceramic, cellular substrate defining an array of hexagonally shaped cells. The cell walls taper to an edge and are coated with a conductive material such as aluminum. The cells are filled with a scintillation material such as cesium iodide. A first flat photocathode is provided adjacent the first substrate. An intermediate assembly spaced from the scintillator assembly is provided comprised of a second ceramic, cellular substrate similar to the first. The cell walls are coated with a conductive material such as aluminum. A support layer is mounted to the substrate on an end opposite the scintillator assembly. A first flat phosphor display screen is mounted to the support layer on a side internal the second substrate. A second photocathode is provided adjacent the second substrate. An output assembly spaced from the intermediate assembly is provided and is comprised of a third ceramic cellular substrate which is similar to the first and second substrate. The cell walls are coated with a conductive material such as aluminum. A second flat phosphor display screen is mounted to the third substrate on an end opposite the second substrate. An output window mounted to the tube envelope and adjacent the second display screen is provided. Means are provided for applying separate electrostatic potentials between the various substrates.

13 Claims, 2 Drawing Sheets

SCINTILLATOR ASSEMBLY
INTERMEDIATE ASSEMBLY
OUTPUT ASSEMBLY
X-RAY
ELECTRONS
ELECTRONS

BACKSCATTER ELECTRONS
STRAY LIGHT
PHOTONS 22
24
26
28
30
32
34
36
38
40
42
44
46
48
50
52
54
56
58
60

METHOD OF FORMING PANEL TYPE RADIATION IMAGE INTENSIFIER

This application is a divisional of copending application Ser. No. 838,100 filed Mar. 10, 1986 entitled Improved Panel Type Radiation Image Intensifier which issued as U.S. Pat. No. 4,730,103 on Mar. 8, 1988.

TECHNICAL FIELD

The present invention relates generally to the field of radiation imaging and, more particularly to an x-ray image intensifier tube of the proximity type for medical x-ray diagnostic use.

BACKGROUND ART

In U.S. Pat. No. 4,255,666 owned by the present assignee, a two-stage, proximity type image intensifier is described. This device incorporated two stages of amplification in an effort to provide improved gain over that of a single-stage device described in U.S. Pat. No. 4,140,900 also owned by the present assignee. Both U.S. Pat. Nos. 4,140,900 and 4,255,666 are hereby expressly incorporated herein by reference.

The two stage device described in U.S. Pat. No. 4,255,666 incorporates a flat scintillator screen, an output display screen and an amplification means intermediate to the scintillator screen and the output display screen. The two stage image intensifier tube comprises a metallic vacuum tube envelope and a metallic, inwardly concave input window.

In operation, an x-ray source generates a beam of x-rays which passes through a patient's body and casts a shadow onto the input window of the tube. The x-ray image passes through the input window and impinges upon the flat scintillation screen which is deposited on an aluminum substrate. The scintillation screen converts the x-ray image into a light image. This light image is "contact transferred" directly to an immediately adjacent first photocathode layer which converts the light image into a pattern of electrons. The scintillation screen and photocathode layer comprise a complete assembly.

A first phosphor display screen is mounted on one face of a fiber optic plate which is suspended from the tube envelope by means of insulators. On the opposite face of the fiber optic plate a second photocathode is deposited. The fiber optic plate is oriented in a plane substantially parallel to the plane of the scintillation screen.

A second phosphor display screen is deposited on an output window. A high voltage power supply is connected between the first phosphor display screen and the first photocathode as well as between the second photocathode and the second phosphor display screen. The power supply provides approximately 15 kV to each stage (approximately 30 kV total). The first display screen and the second photocathode are connected together and operate at the same potential.

In operation, the electron pattern on the negatively charged first photocathode layer is accelerated towards the first, positively charged (relative to the photocathode layer) phosphor display screen by means of the electrostatic potential supplied by the high voltage source connected between the display screen and the photocathode screen. The electrons striking the display screen produce a corresponding light image which passes through the fiber optic plate to impinge on the second photocathode. The second photocathode then emits a corresponding pattern of electrons which are accelerated toward the second phosphor display screen to produce an output light image which is viewable through the output window.

While the two-stage device described above did achieve fundamental performance improvements in gain as well as other parameters over the single-stage device, it still did not achieve the performance of conventional inverter type x-ray image intensifiers. Performance of the two-stage device is found to fall short in three distinct areas: brightness gain, contrast ratio and limiting resolution.

The two-stage device has a conversion brightness of approximately one-third that of conventional inverter type tubes. This difference is due in part to the fact that the two-stage device is a unity magnification device while conventional inverter type tubes are typically $\times 10$ demagnification devices. This difference translates directly to a 100 fold increase in conversion gain. The image size of the inverter type tube is however only 1/10th that of the two-stage device.

The two-stage device did achieve a threefold increase in gain over the single-stage device by the incorporation of the fiber optic element. This element, however, added significantly to the cost of the device, increased its overall weight and reduced its ruggedness as well. Further increases in gain have not been achieved due to the prohibitive cost of providing additional stages of amplification or the inability to further optimize the efficiency of the various layers which comprise the two-stage device.

Image contrast of the two-stage device has also been found inferior to the conventional inverter type tubes. Typically large area contrast ratios for the inverter tubes are better than 20:1 while the two-stage device exhibits a 15:1 contrast ratio. The loss of image contrast in the two-stage device is primarily due to reflected light and backscattered electrons within the space between the photocathode and phosphor layers. In inverter type tubes the same problems exist but to a lesser degree since the large space between the single photocathode and phosphor layers allow for a substantial amount of dispersion. Attempts to improve the performance of the two-stage device through the incorporation of antireflection layers and optimization of the aluminum layer coatings on the phosphor screens have rarely achieved the 20:1 contrast of the inverter type tubes.

Resolution is a measure of how faithfully an optical device reproduces detail. In this respect, the two-stage device suffers in performance by up to 30% due largely to the extreme sensitivity of its proximity focussing technique to the surface texture of the cesium iodide scintillator. This degradation is compounded by optical and x-ray scattering within the scintillator. Thinner scintillators or scintillators composed of finer crystals could offer improvements. However, thinner crystals reduce scintillator efficiency and gain while a finer crystal structure further roughens the surface.

It is therefore an object of this invention to overcome the above referenced problems and others by providing an improved panel type image intensifier tube whose performance is comparable to that of conventional inverter type tubes.

DISCLOSURE OF THE INVENTION

The disadvantages of the prior art as described above are reduced or eliminated by the provision of an improved panel type image intensifier tube.

The proximity type, radiation sensitive image intensifier tube of the present invention comprises an open ended, hollow, evacuated envelope which is closed on one end by a metallic, concave input window and at the opposite end by a glass output window. A first substrate material defining a plurality of cells or through holes is provided. The cells are preferably hexagonal in shape similar to a honeycomb structure. The walls of the cells are coated with a thin conductive, reflective layer preferably aluminum. A scintillator material, preferably cesium iodide, fills the voids of the cells. The scintillator material converts a pattern of impinging radiation into a corresponding light pattern. The light pattern is contact transferred to a first flat photocathode layer which lies substantially parallel and immediately adjacent the first substrate material. The first photocathode layer in turn, converts the light pattern into a corresponding first photoelectron pattern.

A second substrate material defining a plurality of cells or through holes is also provided. The walls of the cells are coated with a thin conductive layer preferably aluminum. The second substrate is spaced from the first photocathode layer on a side opposite the input window. A transparent support layer is mounted to the second substrate on an end opposite the first substrate material. A first flat phosphor display screen is mounted to the transparent support layer on a side internal to the second substrate material. The first photoelectron pattern emitted by the first photocathode is directed to the first display screen via the second substrate material. The photoelectrons striking the first display screen cause it to emit photons in a pattern corresponding to the first photoelectron pattern. A second, flat photocathode layer is mounted substantially parallel and immediately adjacent to the transparent support layer on a side opposite the first display screen. Photons emitted from the first display screen strike the second photocathode layer which converts the photons to a corresponding second photoelectron pattern.

A third substrate material defining a plurality of cells or through holes is also provided. The cells are again coated with a thin conductive layer preferably aluminum. The third substrate material is spaced from the second photocathode layer on a side opposite the first substrate material. A second flat phosphor display screen is mounted to the third substrate material and is substantially parallel to the second photocathode layer. The second photoelectron pattern emitted by the second photocathode layer is directed to the second display screen via the third substrate material. The photoelectrons striking the second display screen are converted to a visual image corresponding to the incident radiation pattern.

Means are also provided for applying separate electrostatic potentials between the first and second substrate materials and the second and third substrate materials respectively. The electrostatic potentials accelerate the first and second photoelectron patterns toward the first and second display screens respectively.

In the preferred embodiment the substrate material is pattern etched glass or glass-ceramic. The etching provides through holes or cells with straight angular walls. The walls taper to a sharp edge.

In an alternate embodiment of the present invention a proximity type, radiation sensitive image intensifier tube is provided. The tube is characterized by a scintillator stage which converts impinging radiation into a corresponding light pattern; a light amplification stage following the scintillation stage for producing a first pattern of photoelectrons corresponding to the first light pattern, accelerating the first pattern of photoelectrons along a path and converting the first pattern of photoelectrons to a second corresponding light pattern; and an output stage following the light amplification stage for producing a second pattern of photoelectrons corresponding to the second light pattern, accelerating the second photoelectron pattern along a path substantial in line with the path of the first photoelectron pattern and converting the second photoelectron pattern to a visible light image. At least one of the above described stages comprises a substrate material defining a plurality of cells. The cells are aligned along the path of the accelerated photoelectrons. The cell walls are coated with a thin conductive coating, preferably aluminum.

It is therefore an object of the present invention to provide an improved proximity type radiation image intensifier having improved gain, contrast ratio and resolution.

It is still another object of the present invention to provide an improved proximity type radiation image intensifier at a reduced cost.

It is still another object of the present invention to provide an improved proximity type radiation image intensifier with substantially less weight.

It is still another object of the present invention to provide an improved proximity type radiation image intensifier having improved resistance to environmental factors such as shock and vibration.

The foregoing and other objectives, features and advantages of the present invention will become apparent to those of ordinary skill in the art upon reading and understanding the following detailed description of the preferred embodiment.

BRIEF DESCRIPTION OF THE DRAWINGS

The invention may be embodied in various steps and arrangements of steps and various components and arrangements of components. The drawings are only for purposes of illustrating a preferred embodiment and are not to be construed as limiting the invention.

BEST MODE FOR CARRYING OUT THE INVENTION

Figure 1:
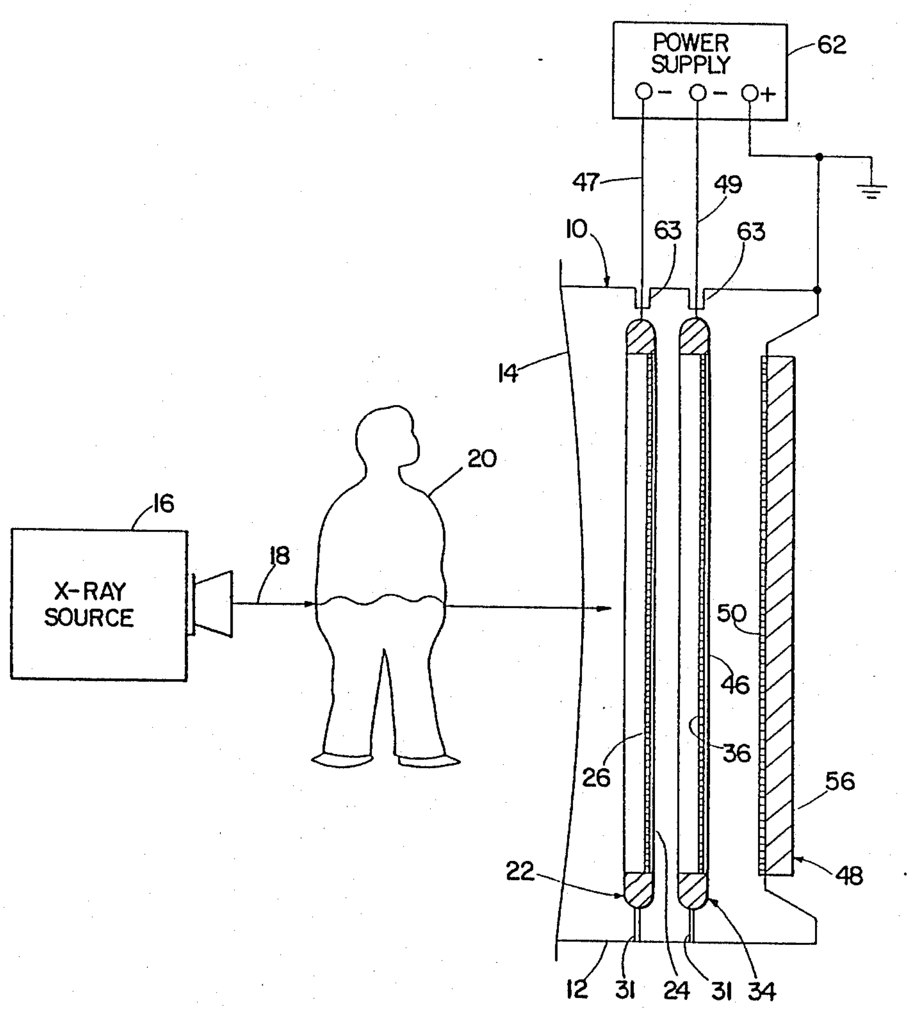
FIG. 1 is a diagrammatic illustration of the panel type radiation image intensifier in accordance with the present invention.
Figures 2, 3A, 3B, 3C:
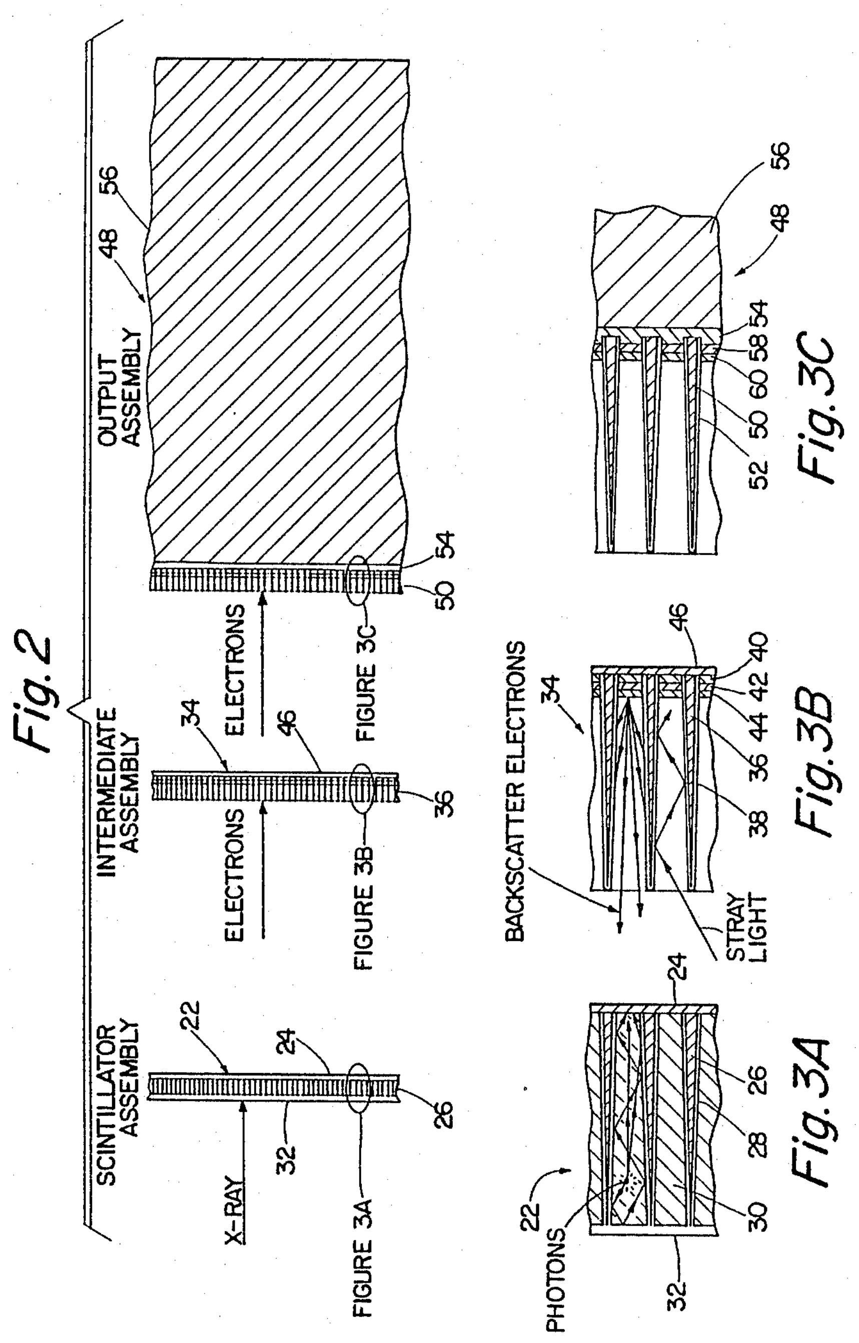
FIG. 2 is a vertical, sectional view of a portion of the image intensifier tube of the present invention.
FIGS. 3A, 3B and 3C are enlarged, vertical, sectional views of the portion of the image intensifier tube depicted in FIG. 2.

Referring to FIGS. 1 and 2, a panel shaped proximity type radiation image intensifier tube 10 according to the present invention is illustrated. It should be noted at the outset that while the invention is described in terms of sensitivity to x-rays, it is not intended to limit the applicability of the invention to x-ray detection. The invention has equal utility in detecting gamma radiation or other penetrative radiation. The image intensifier tube 10 comprises a metallic, typically type 304 stainless steel, vacuum tube envelope 12 and a metallic, inwardly concave input window 14. The window 14 is made of a specially chosen metal foil or alloy metal foil in the family of iron, chromium, and nickel, and in some embodiments, additionally combinations of iron or nickel together with cobalt or vanadium. It is important to note that these elements are not customarily recognized in the field as a good x-ray window material in the diagnostic region of the x-ray spectrum. By making the window thin, down to 0.1 mm in thickness, the applicant was able to achieve high x-ray transmission with these materials and at the same time obtain the desired tensile strength. In particular, a foil made of 17-7 PH type of precipitation hardened chromium-nickel stainless steel is utilized in the preferred embodiment. This alloy is vacuum tight, high in tensile strength and has very attractive x-ray properties, e.g., high transmission to primary x-rays, low self-scattering, and reasonably absorbing with respect to patient scattered x-rays. The window 14 is concaved into the tube like a drum head.

The use of materials which are known for high x-ray transmission such as beryllium, aluminum and titanium for example cause the undesirable scattering which is present in some prior art proximity type, x-ray image intensifier devices.

One purpose of having a metallic window 14 is that it can be quite large in diameter with respect to the prior art type of convex, glass window without affecting the x-ray image quality. In one embodiment, the window measures 0.1 mm thick, 25 cm by 25 cm and withstood over 100 pounds per square inch of pressure. The input window can be square, rectangular, or circular in shape, since it is a high tensile strength material and is under tension rather than compression.

In operation, an x-ray source 16 generates a beam of x-rays 18 which passes through a patient's body 20 and casts a shadow or image onto the face of the tube 10. The x-ray image passes through the input window 14 and impinges upon a scintillator assembly 22 which converts the x-ray image to a light image. This light image is contact transferred directly to an immediately adjacent, first flat photocathode layer 24 which converts the light image into a first pattern of electrons.

Referring also to FIG. 3A, the scintillator assembly 22 is preferably comprised of a cellular plate substrate 26, a conductive, reflective coating 28, scintillator material 30, a first photocathode layer 24 and reflective conductive layer 32.

The cellular plate substrate 26 is a low cost, pattern etched ceramic plate available from Corning as part of their Fotoform ®/Fotoceram ® precision photosensitive glass material product line. Fotoform and Fotoceram products are described in more detail in Corning product brochure No. FPG-4 which is expressly incorporated herein by reference. It should be noted that these cellular plates are not micro-channel plates. The cellular plate of the present invention is approximately 9" in diameter and about 0.025" thick. In the preferred embodiment, the plate is etched with a pattern of hexagonally shaped through holes or cells that are typically 0.004" wide and are arranged to produce uniform 0.001" walls between the holes. The etched array is similar to a honeycomb structure. As a result of the etching process, straight angular walls result which taper to a virtual knife's edge. This tapering is apparent in FIG. 3A. The cellular plate substrate 26 is oriented within the tube envelope 12 such that the tapered edges face toward the input window 14. It should be noted that there is very little reduction in conversion efficiency due to the dead space created by the cell walls. Since the walls are tapered structures that approach zero thickness at the x-ray input surface, the effective open area for this structure is greater than 90%.

It should also be noted that it is possible to alter the particular cell shape of a given cellular plate. Geometrics of almost any size and shape can be etched into the ceramic plate. Likewise the plates can be square, rectangular or circular in shape.

The walls of each cell of the cellular plate 26 are coated with a reflective, conductive layer 28. The layer 28 should be highly reflective to the light and is formed by vacuum depositing aluminum to a thickness of approximately 1000 angstroms in a known manner. After coating, the voids between the cell walls are filled with a scintillator material 30 preferably cesium iodide (CsI(NA)). In the preferred embodiment the scintillator material 30 is vacuum evaporated onto the cells walls until the material completely fills the voids. The overall thickness of the scintillator material 30 is chosen to be approximately the same as the cellular plate 26.

On the input side of the scintillator assembly 22 (side adjacent to the input window 14), an additional reflective, conductive layer 32 is preferably applied. The layer 32 is aluminum vacuum deposited to a thickness of several thousand angstroms. A wide variation of aluminum thickness, ranging from a few thousand angstroms up to a few mils, provides acceptable performance. While application of layer 32 is preferred it is not necessary for the operation of the present invention.

On the output side of the scintillator assembly 22, a first photocathode layer 24 is deposited to a thickness of approximately 50 angstroms. The photocathode material is well known to those skilled in the art, being cesium and antimony ($Cs_3Sb$) (industry photocathode types S-9 or S-11) or multi-alkali metal (combination of cesium, potassium and sodium) and antimony.

In operation, x-rays entering the tube 10 pass through the thin, conductive layer 32 and are absorbed in the scintillator material 30 within each cell of the substrate 26. The scintillator material 30 releases photons which travel directly or through internal reflection to the first photocathode layer 24. Photons striking the photocathode layer 24 cause the release of a first pattern of electrons which is accelerated to an intermediate assembly 34. The manner in which the first electron pattern is accelerated is described in more detail below.

The use of a cellular plate as a substrate for the scintillator assembly 22 results in separation of the individual cesium iodide crystals into predetermined structures. This configuration offers a fundamental improvement over the prior art two-stage device by enabling precise control of this critical first conversion layer which is the limiting factor in the detection sensitivity of the entire device. In the prior art two-stage device, the scintillation screen is a vacuum deposited, mosaic grown crystal. However, tradeoffs in crystal size, smoothness, and thickness of the scintillation material lead to a compromise in the two-stage device's ability to reproduce detail. The cellular structure of the present invention enables independent control of these parameters. The thickness of the cesium iodide in the present invention is increased 2× over that of the two-stage device. This increased thickness improves x-ray absorption and reduces the loss of K fluorescent x-rays.

Better coupling of photons to the first photocathode layer 24 is achieved due to better cesium iodide transparency. Transparency is higher since the cesium iodide can now be annealed without the worry of cells growing together. Annealing is the process of heat treating a material to remove internal stress and nonuniformities. In cesium iodide, clarity of the evaporated material is greatly reduced by stress and non-uniformity which causes light scattering and absorption. Annealing at temperatures of a few hundred degrees centigrade greatly improves this condition. Without the cellular structure, however, the crystals of cesium iodide would "grow" together during the annealing process to form crystals that are too large for good resolution. The cellular plate prevents this from occurring. Through the use of the cellular plate, the final annealed cesium iodide crystal size is no greater than the cell size of the cellular plate. Also since the cells are independent and also captured within the cellular structure, roughened surfaces for adhesion control or resulting from crystal growth constraints of the prior art devices are not longer necessary. Thus a flat and smooth surface can now be maintained thereby improving resolution. Lateral transmission or crosstalk between the cells is also eliminated by the cell walls thus improving contrast.

The use of the cellular structure as a substrate also eliminates the need for the intervening aluminum substrate used in the prior art devices. In the prior art device, x-rays must first pass through the aluminum substrate before absorption in the cesium iodide. Elimination of this aluminum substrate reduces the weight of the overall device and increases the conversion efficiency of the device.

The conductive reflective coating 28 applied to the individual cell walls creates a conductive matrix. The matrix permits the use of a photocathode layer that has a high sensitivity. It is known that by increasing the sensitivity of photocathode, a tradeoff in conductivity will result. In the prior art devices conductivity of the photocathode was critical. The conductivity of the intermediate cesium iodide layer in the prior devices was very poor, therefore, the conductivity of the photocathode must be kept sufficiently high to replenish charge to prevent positive charging of the photocathode (charging disrupts the image and can destroy the photocathode). Typically, in the prior art, photocathodes are 2× thicker than is desirable because of the necessity to maintain good conductivity over a large (×9" diameter) area.

In the present invention, the photocathode 24 is connected to the conductive matrix at each cell. The conductive matrix connects to the high voltage as explained in more detail below. Therefore, the low conductivity of the cesium iodide is not critical since the conductive matrix provides for conduction directly. As a result, a thinner photocathode can be used since charge must be replenished only over the area of a single cell, instead of a 9" diameter area. Therefore, thinner photocathode layers can be used with an increase in sensitivity. Better coupling of photons to the photocathode is also achieved due to the independent control of cell reflectivity and improved transparency of the cesium iodide crystals.

Referring again to FIGS. 1 and 2 and in particular FIG. 3B, an intermediate assembly 34 is provided. The intermediate assembly 34 is spaced from the scintillator assembly 22 on a side opposite the input window 14. The intermediate assembly 34 is preferably comprised of a cellular plate 36 as a substrate material, a conductive coating 38, a second photocathode layer 46, support layer 40, a first phosphor screen 42 and reflective aluminum layer 44. Substrate 36 is made of the same material and is of similar dimension as is substrate 26 used in the scintillator assembly 22. The walls of the substrate 26 are again tapered to an edge. The substrate 26 is oriented within the tube envelope 12 such that the tapered edges face toward the input window 14. A conductive layer 38 is deposited on the walls of the cells in the same manner as layer 28.

The output end of the plate 36 is sealed off with a light transparent support layer 40 such as potassium silicate. The sealing process involves spreading a thin layer of potassium silicate dissolved in water on a smooth, flat substrate and then pressing the cellular plate against the substrate. After drying, the substrate is removed leaving the potassium silicate behind on the cellular plate. This process produces a thin, transparent "window" at the end of each cell. The thickness of the potassium silicate layer thus applied is typically a few thousandths of an inch.

On the input side of the transparent support layer 40 (side internal to the plate 36), a first phosphor screen 42 is deposited followed by the application of a light reflective aluminum layer 44. The light reflective aluminum layer 44 is formed in the same manner as layer 32. Since layer 44 must be highly transmissive to electrons, rather than to x-rays it is only a few thousand angstroms thick.

The first phosphor screen 42 can be of the well known zinc-cadmium sulfide type (ZnCdS(Ag)) or zinc sulfide (ZnS(Ag)) or a rare earth material like yttrium oxysulfide ($Y_2O_2S(Tb)$) or any other suitable high efficiency blue and/or green emitting phosphor material. The phosphor screen 42 is deposited in a known manner to a thickness of 5 to 50 microns.

On the output side of the transparent support layer 40, a second photocathode layer 46 is formed. The type thickness and the manner in which the second photocathode layer 46 is formed is the same as the first photocathode layer 24.

In operation, the first pattern of electrons released from the first photocathode layer 24 is accelerated by high voltage toward the intermediate assembly 34. Of these electrons, the majority enter the intermediate assembly 34, are directed toward and pass through the aluminum layer 44 and are absorbed predominately in the first phosphor screen 42. Some electrons strike the cell walls and are absorbed. Of the electrons striking the phosphor layer 42 the majority are absorbed but a significant portion are backscattered (see FIG. 3B). The electrons absorbed by the phosphor layer 42 release photons which pass into the transparent support layer 40 either directly or by first reflecting back from the aluminum layer 44 coating the first phosphor screen 42. The photons that are transmitted through the transparent layer are subsequently absorbed in the second photocathode layer 46 which in turn releases a second pattern of electrons toward the output assembly 48.

The use of cellular plate for the intermediate assembly greatly reduces contrast losses due to effective control of the above mentioned backscattered electrons. In the prior art devices, backscatter electrons experience a retarding electric field and thus follow looping trajectories back toward the scintillator and return to the phosphor display screen mounted on the fiber optic plate. Contrast is lost because the return strikes are displaced from the initial strike point by up to a few centimeters. Since the backscatter electrons possess sufficiently high energy, the return strikes can be subsequently converted to light in the phosphor which in turn cause the release of electrons from a remote location. The effect is a circular glow about the point of interest. By utilizing the cellular plate substrate of the present invention, the majority of the backscatter electrons strike the cell walls and are absorbed thereby eliminating the circular glow described above.

The use of the cellular plate also aids in the reduction of surface reflectivity to scattered or stray light between the scintillator assembly 22 and the intermediate assembly 34. In the prior art devices, stray light reflects to some degree as it strikes the aluminum layer coating the phosphor screen. The reflected light then falls on the photocathode of the prior stage giving rise to signals from the wrong location. The cellular plate of the present invention has a very low effective reflectivity since it traps and subsequently absorbs scattered photons within each cell (see FIG. 3B).

As with the scintillator assembly 22, the cellular plate used in the intermediate assembly 34 provides an exposed conductive matrix which eliminates the need to supply current to the second photocathode layer 46 over long distances. This allows a reduction in the thickness of photocathode 46 which leads to an increase in gain. The advantage of using the thinner photocathode in the intermediate assembly is much more pronounced than in the scintillator assembly since photocathode 46 must provide about 50× greater operating current. Hence the sensitivity of the prior art devices was greatly compromised to achieve the necessary conductivity.

Referring to FIG. 3C, an output assembly 48 is provided. The output assembly 48 is spaced from the intermediate assembly 34 on a side opposite the scintillator assembly 22. The output assembly 48 is preferably comprised of a cellular plate 50, conductive coating 52, a second phosphor screen 58, aluminum coating 60, sealing glass 54 and output window 56.

A cellular plate is also used as the substrate for the output assembly 48. The cellular plate 50 is identical to the cellular plate 36 used in the intermediate assembly 34. The substrate 50 is again oriented within the tube envelope 12 such that the tapered edges face toward the input window 14. The cellular plate 50 is again coated with a conductive layer 52 in the same manner as layers 28 and 38. The second phosphor screen 58 is comprised of the same class of materials and deposited in the same manner as the first phosphor screen 42. The output side of the plate 50 is sealed using transparent sealing glass 54 which couples the plate 50 to an output window 56. The output window 56 is preferably clear glass. A second phosphor screen 58 and aluminum overcoating 60 are deposited to the input side of the sealing glass 54 in the same manner as the above described first phosphor screen 42 and aluminum layer 44 found in the intermediate assembly 34.

The operation of the output assembly 48 is the same as the intermediate assembly 34 except that photons liberated from the second phosphor layer 58 pass through the sealing glass 54 and are transmitted to the output window 54 for viewing by the operator. This approach to the output assembly 48 offers the same contrast improvement benefits as cited for the intermediate asselby 34 since the same degradation mechanism exists in the output assembly of the prior art devices.

Referring back to FIG. 1, a high voltage power supply 62 is connected between the scintillator assembly 22 and the intermediate assembly 34 as well as between the intermediate assembly 34 and the output assembly 48. The connections to these assemblies are made via the conductive matrices 28, 38 and 52. The voltage potentials are chosen such that the potential between the scintillator assembly 22 and the intermediate assembly 34 is in the range of 5–30 kV; preferably 15 kV and the potential between the intermediate assembly 34 and the output assembly 48 is in the range of 5–40 kV; preferably 15 kV. The preferred total operating voltage is therefore approximately 30 kV.

In operation, the first electron pattern on the negatively charged scintillator assembly 22 is accelerated towards the positively charged (relative to the scintillator assembly 22) intermediate assembly 34 by means of the electrostatic potential supplied by the high voltage source 62 connected between the scintillation assembly 22 and the intermediate assembly 34. The electrons striking the first phosphor screen 42 produce a corresponding light image (i.e., photons are emitted in a corresponding pattern) which pass through the transparent support layer 40 to impinge on the second photocathode 46. The second photocathode 46 then reemits a corresponding second pattern of electrons which are accelerated toward the output assembly 48 to produce an output light image which is viewable through the window 56.

Although the output assembly 48 is positive with respect to the intermediate assembly 34, it is at a neutral potential with respect to the remaining elements of the tube, including the metallic envelope 12, thereby reducing distortion due to field emission.

It should be noted that like the two-stage prior art device substantially no focusing takes place in the tube of the present invention. The scintillator assembly 22, the intermediate assembly 34 and the output assembly 48 are substantially parallel to one another.

In the preferred embodiment, the spacing between the output end of the scintillator assembly 22 and the input end of the intermediate assembly 34 is preferably 10 mm and the spacing between the output end of the intermediate assembly 34 and the input end of the output assembly 48 is preferably 14 mm. In other embodiments these spacings could range between 1 to 30 mm.

Furthermore, the applied voltages across the respective gaps are 15,000 volts each which are each lower than in the prior art devices. Thus, the voltage per unit of distance, i.e., the field strengths of the improved tube according to the invention are 1.5 Kv/mm (first stage) and 1.1 Kv/mm (second stage).

By keeping the assembly spacing and the field strength within the above mentioned limits the improved tube of the present invention is not only able to achieve high gain at lower over-all operating voltage (on the order of 40,000–100,000 cd-sec/m$^2$-R), but is also able to do this with a higher resolution and contrast ratio than the highest gain (30,000–50,000 cd-sec/m$^2$-R) two-stage proximity type tubes.

Also the various feedback mechanisms, such as ions and x-rays generated at the output assembly are either eliminated or greatly diminished in their effect. The lower voltage per stage and shorter gap reduces the velocity and dispersion of the electrons striking the display screens and therefore reduces or eliminates the number of ions and x-rays which would be generated by higher velocity electrons striking the display screens.

The scintillator assembly 22 and the intermediate assembly 34 are suspended from the tube envelope 12 between the input window 14 and the output assembly 48 by several insulating posts 31. At one end high voltage feedthrus 63 are provided to allow high voltage cables 47 and 48 from power supply 62 to be inserted through the tube envelope to provide the scintillator assembly 22 and the intermediate assembly 34 with negative high potentials.

The remaining parts of the intensification tube including the metallic envelope 12, are all operated at ground potential. This concept of minimizing the surface area which is negative with respect to the output assembly results in reduced field emission rate inside the tube and allows the tube to be operable at higher voltages and thus higher brightness gain. It also minimizes the danger of electrical shock to the patient or workers if one should somehow come in contact with the exterior envelope of the tube.

To reduce accumulated charges, the insulating posts 31 and high voltage feedthrus 63 are coated with a slightly conductive material such as chrome oxide which bleeds off the accumulated charge by providing a leakage path.

It should also be noted that through utilizing the cellular plates of the present invention, the fiber optic element of the prior art two-stage device is eliminated. The fiber optic element, while contributing to performance improvements in the two-stage device over the one-stage device, added to the manufacturing cost of the tube as well as to the overall tube weight and compromised its resistance to severe environments. By the elimination of the fiber optic element the ruggedness of the image intensifier of the present invention is improved thereby making it suitable for military applications.

The essentially all metalic and rugged construction of the tube minimizes the danger of implosion. The small vacuum space enclosed by the tube represents much smaller stored potential energy as compared with a conventional tube which further minimizes implosion danger. Furthermore, if punctured, the metal behaves differently from glass and the air supply leaks in without fracturing or imploding.

The invention as described modifies the three components of the prior art devices by incorporating cellular plates as the substrate material. By configuring all three components in this manner maximum performance improvement will be realized. It is to be appreciated, however, that a panel type image intensifier tube can be configured by replacing any single assembly or combination of assemblies of the prior art devices with an assembly constructed in accordance with the present invention.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

Having thus described the preferred embodiment, the invention is now claimed to be:

1. A method of forming a first conversion layer for use in a proximity type, radiation sensitive image intensifier comprising the steps of:

a. etching a glass plate to form an array of through holes with straight angular walls;
b. vacuum depositing a conductive coating onto said walls;
c. vacuum evaporating a scintillator material onto said walls; and
d. annealing said scintillator material.

2. The method of claim 1 wherein the etching step forms through holes which are hexagonal.

3. The method of claim 1 wherein the vacuum evaporating step fills the holes with scintillation material.

4. The method of claim 1 wherein the annealing step is performed between 200° and 300° C.

5. The method of claim 1 additionally comprising the step of depositing a photocathode layer to one side of the first conversion layer.

6. The method of claim 1 wherein the etching step results in through holes having a length substantially greater than the width.

7. A method of forming a second conversion layer for use in a proximity type, radiation sensitive image intensifier comprising the steps of:

a. etching a glass plate to form an array of through holes with straight angular walls;
b. vacuum depositing a conductive coating onto said walls;
c. sealing off one end of said plate with a light transparent support layer;
d. depositing a phosphor layer to the light transparent support layer on a side adjacent said plate; and
e. depositing a photocathode layer to the light transparent support layer on a side opposite said plate.

8. The method of claim 7 wherein the etching step forms through holes which are hexagonal.

9. The method of claim 7 wherein the phosphor layer depositing step deposits a phosphor to a thickness of 5 to 50 microns.

10. The method of claim 7 wherein the etching step results in through holes having a length substantially greater than the width.

11. A method of forming a third conversion layer for use in a proximity type, radiation sensitive image intensifier comprising the steps of:

a. etching a glass plate to form an array of through holes with straight angular walls;
b. vacuum depositing a conductive coating into said walls;
c. sealing off one end of said plate with a layer of transparent sealing glass; and
d. depositing a phosphor layer to the layer of sealing glass on a side adjacent said plate.

12. The method of claim 11 wherein the etching step forms through holes which are hexagonal.

13. The method of claim 11 wherein the etching step results in through holes having a length substantially greater than the width.

* * * * *